(12) United States Patent
Hwang

(10) Patent No.: US 8,503,346 B2
(45) Date of Patent: Aug. 6, 2013

(54) WIRELESS NETWORK USING NETWORK CODING SCHEME BASED ON OVERHEARING CHANNEL

(75) Inventor: Chan Soo Hwang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 999 days.

(21) Appl. No.: 12/557,549

(22) Filed: Sep. 11, 2009

(65) Prior Publication Data

US 2010/0074166 A1 Mar. 25, 2010

(30) Foreign Application Priority Data

Sep. 25, 2008 (KR) .................. 10-2008-0094290
Jun. 26, 2009 (KR) .................. 10-2009-0057835

(51) Int. Cl.
*H04H 20/71* (2008.01)
(52) U.S. Cl.
USPC .................... 370/312; 370/235; 370/352
(58) Field of Classification Search
USPC ............ 370/235, 312, 352–356, 389–392, 370/428–429, 441–442, 478–480
See application file for complete search history.

(56) References Cited

U.S. PATENT DOCUMENTS

| 7,209,759 | B1 * | 4/2007 | Billing et al. | 455/466 |
|---|---|---|---|---|
| 7,693,939 | B2 * | 4/2010 | Wu et al. | 709/203 |
| 7,924,761 | B1 * | 4/2011 | Stevens | 370/315 |
| 8,005,033 | B2 * | 8/2011 | Li et al. | 370/315 |
| 2004/0218632 | A1 | 11/2004 | Kang | |
| 2004/0223438 | A1 | 11/2004 | Kura et al. | |
| 2007/0147284 | A1 | 6/2007 | Sammour et al. | |
| 2007/0223438 | A1 | 9/2007 | Bennett | |
| 2007/0274324 | A1 * | 11/2007 | Wu et al. | 370/400 |
| 2010/0316046 | A1 * | 12/2010 | Kalmanek et al. | 370/352 |

FOREIGN PATENT DOCUMENTS

| JP | 2006-148919 | 6/2006 |
|---|---|---|
| KR | 1020080071668 | 8/2008 |

OTHER PUBLICATIONS

Sachin Katti, et al., "XORs in the Air: Practical Wireless Network Coding," ACM Sigcomm, 2006, pp. 243-254.
Sachin Katti, et al., "Embracing Wireless Interference: Analog Network Coding," ACM Sigcomm, 2007, pp. 397-408.

* cited by examiner

*Primary Examiner* — Kevin Mew
(74) *Attorney, Agent, or Firm* — NSIP Law

(57) ABSTRACT

A wireless network using a network coding scheme is provided. The wireless network may include at least two source nodes, at least two destination nodes, and a relay node. The at least two source nodes may divide source messages into partial source messages, and transmit the partial source messages to the relay node. The relay node may generate a network-coded message using the network coding scheme. The at least two destination nodes may overhear the partial source messages using overhearing channels and obtain the source messages based on the received network-coded message.

28 Claims, 9 Drawing Sheets

$M11 \rightarrow M11\text{-}1 + M11\text{-}2$
$M12 \rightarrow M12\text{-}1 + M12\text{-}2$
$M21 \rightarrow M21\text{-}1 + M21\text{-}2$
$M22 \rightarrow M22\text{-}1 + M22\text{-}2$

FIG. 6

| TIME | PHASE 1 | | | | | | | | PHASE 2 | | |
|---|---|---|---|---|---|---|---|---|---|---|---|
| | DECODING ORDER:1→2 | | | | DECODING ORDER:2→1 | | | | | | |
| MESSAGE | $t_{11}$ | $t_{12}$ | $t_{13}$ | $t_{14}$ | $t_{15}$ | $t_{16}$ | $t_{17}$ | $t_{18}$ | $t_{21}$ | $t_{22}$ | $t_{23}$ |
| M11 | $R_{11}$ | $R_{11}$ | | | $R_{13}$ | $R_{13}$ | | | | | |
| M12 | | | $R_{12}$ | $R_{12}$ | | | $R_{14}$ | $R_{14}$ | | $R_{16}$ | |
| M21 | $R_{21}$ | | $R_{21}$ | | $R_{23}$ | | $R_{23}$ | | | | |
| M22 | | $R_{22}$ | | $R_{22}$ | | $R_{24}$ | | $R_{24}$ | | | $R_{26}$ |
| M11⊕M21 | | | | | | | | | $R_{15}=R_{25}$ | | |

FIG. 7

|  |  | PHASE 1 | | | | PHASE 2 | | |
|---|---|---|---|---|---|---|---|---|
|  |  | DECODING ORDER:1→2 | | DECODING ORDER:2→1 | | | | |
|  | TIME | $t_{11}$ | $t_{12}$ | $t_{15}$ | $t_{17}$ | $t_{21}$ | $t_{22}$ | $t_{23}$ |
| MESSAGE | M11 | $R_{11}$ | $R_{11}$ | $R_{13}$ | | | | |
| | M12 | | | | $R_{14}$ | | $R_{16}$ | |
| | M21 | $R_{21}$ | | $R_{23}$ | $R_{23}$ | | | |
| | M22 | | $R_{22}$ | | | | | $R_{26}$ |
| | M11⊕M21 | | | | | $R_{15}=R_{25}$ | | |

FIG. 8

OPTIMIZATION TABLE 1 810

| | | | PHASE 1 DECODING ORDER: 2→1 | | PHASE 2 | |
|---|---|---|---|---|---|---|
| | | TIME | $t_{15}$ | $t_{17}$ | $t_{21}$ | $t_{22}$ |
| | MESSAGE | M11 | $R_{13}$ | | | |
| | | M12 | | $R_{14}$ | | $R_{16}$ |
| | | M21 | $R_{23}$ | $R_{23}$ | | |
| | | M22 | | | | |
| | | M11⊕M21 | | | $R_{15}=R_{25}$ | |

OPTIMIZATION TABLE 2 820

| | | | PHASE 1 DECODING ORDER: 1→2 | | PHASE 2 | |
|---|---|---|---|---|---|---|
| | | TIME | $t_{11}$ | $t_{12}$ | $t_{21}$ | $t_{22}$ |
| | MESSAGE | M11 | $R_{11}$ | $R_{11}$ | | |
| | | M12 | | | | |
| | | M21 | $R_{21}$ | | | |
| | | M22 | | $R_{22}$ | | $R_{26}$ |
| | | M11⊕M21 | | | $R_{15}=R_{25}$ | |

OPTIMIZATION TABLE 3 830

| | | | PHASE 1 | | PHASE 2 |
|---|---|---|---|---|---|
| | | | DECODING ORDER: 1→2 | DECODING ORDER: 2→1 | |
| | | TIME | $t_{11}$ | $t_{15}$ | $t_{21}$ |
| | MESSAGE | M11 | $R_{11}$ | $R_{13}$ | |
| | | M12 | | | |
| | | M21 | $R_{21}$ | $R_{23}$ | |
| | | M22 | | | |
| | | M11⊕M21 | | | $R_{15}=R_{25}$ |

WIRELESS NETWORK USING NETWORK CODING SCHEME BASED ON OVERHEARING CHANNEL

CROSS-REFERENCE TO RELATED APPLICATION

This application claims the benefit under 35 U.S.C. §119(a) of a Korean Patent Application No. 10-2008-0094290, filed Sep. 25, 2008, and a Korean Patent Application No. 10-2009-0057835, filed on Jun. 26, 2009 in the Korean Intellectual Property Office, the entire disclosures of which are incorporated herein by reference for all purposes.

BACKGROUND

1. Field

The following description relates to a wireless network using a network coding scheme, and more particularly, to a technology applicable to a wireless mesh network, wireless ad-hoc network, wireless sensor network, and the like.

2. Description of the Related Art

Much research on various communication protocols applicable to a wireless network has been conducted. In particular, it has been noted that nodes of a wireless network may have limited transmission power, and states of channels among nodes may change. As a result, a throughput of a wireless network may not easily increase.

Accordingly, a network coding scheme applicable to a wireless network has been the focus of attention. In a wireless network using a network coding scheme, a relay node may appropriately encode messages corresponding to at least two nodes, generate a network-coded message, and transmit the network-coded message to the at least two nodes. In this case, the at least two nodes may appropriately decode the network-coded message, and thereby may extract desired messages.

Generally, a network coding scheme may be used to increase throughput of a wireless network. However, since a state of a wireless channel may change, what is needed is a network coding scheme optimized based on a state of a wireless channel.

SUMMARY

Accordingly, in one general aspect, there is provided an operation method of a relay node, the method including receiving a 1-1 partial source message and a 1-2 partial source message from a first source node, a first source message of the first source node including the 1-1 partial source message and the 1-2 partial source message, receiving a 2-1 partial source message and a 2-2 partial source message from a second source node, a second source message of the second source node including the 2-1 partial source message and the 2-2 partial source message, transmitting a network-coded message to a first destination node corresponding to the first source node and a second destination node corresponding to the second source node, the network-coded message being generated based on the 1-1 partial source message and the 2-1 partial source message.

In another general aspect, there is provided an operation method of a relay node, the method including receiving a 1-1 partial source message and a 1-2 partial source message from a first source node, and receiving a 2-1 partial source message and a 2-2 partial source message from a second source node during a first time period, a first source message of the first source node including the 1-1 partial source message and the 1-2 partial source message, and a second source message of the second source node including the 2-1 partial source message and the 2-2 partial source message, extracting the 1-1 partial source message, the 1-2 partial source message, the 2-1 partial source message, and the 2-2 partial source message, using a Successive Interference Cancellation (SIC) scheme based on a decoding order with respect to the first source message and the second source message, and transmitting a network-coded message to a first destination node corresponding to the first source node and a second destination node corresponding to the second source node during a second time period, the network-coded message being generated based on the extracted 1-1 partial source message and 2-1 partial source message, and the second time period being different from the first time period.

Where the first source message is decoded earlier than the second source message, the first time period may include partial time periods, $t_{11}$, $t_{12}$, $t_{13}$, and $t_{14}$, where the second source message is decoded earlier than the first source message, the first time period may include partial time periods, $t_{15}$, $t_{16}$, $t_{17}$, and $t_{18}$, and where the second time period includes partial time periods, $t_{21}$, $t_{22}$, and $t_{23}$, the partial time periods, $t_{11}$, $t_{12}$, $t_{13}$, $t_{14}$, $t_{15}$, $t_{16}$, $t_{17}$, $t_{18}$, $t_{21}$, $t_{22}$, and $t_{23}$, may be optimized based on a sum corresponding to the first destination node and the second destination node.

Where a state of an overhearing channel of each of the first destination node and the second destination node is superior to a reference level, it may be recognized that a portion of the partial time periods, $t_{11}$, $t_{12}$, $t_{13}$, $t_{14}$, $t_{15}$, $t_{16}$, $t_{17}$, $t_{18}$, $t_{21}$, $t_{22}$, and $t_{23}$, is non-existent.

Where the decoding order with respect to the first source message and the second source message is determined, it may be recognized that a portion of the partial time periods, $t_{11}$, $t_{12}$, $t_{13}$, $t_{14}$, $t_{15}$, $t_{16}$, $t_{17}$, $t_{18}$, $t_{21}$, $t_{22}$, and $t_{23}$, is non-existent.

Where the state of the overhearing channel of each of the first destination node and the second destination node is superior to the reference level, and a state of a channel between the first source node and the relay node is similar to a state of a channel between the second source node and the relay node within a predetermined range, it may be recognized that a portion of the partial time periods, $t_{11}$, $t_{12}$, $t_{13}$, $t_{14}$, $t_{15}$, $t_{16}$, $t_{17}$, $t_{18}$, $t_{21}$, $t_{22}$, and $t_{23}$, is non-existent.

Other features and aspects will be apparent from the following detailed description, the drawings, and the claims.

BRIEF DESCRIPTION OF THE DRAWINGS

FIG. 6 is a diagram illustrating a data rate corresponding to a first source message, a data rate corresponding to a second source message, and a length of each time period based on a decoding order of a relay node in association with the exemplary operation of the wireless network of FIG. 4, to assist in the understanding of FIG. 5.

FIG. 7 is a diagram illustrating an exemplary table for optimization with less computation.

FIG. 8 is a diagram illustrating exemplary simplified tables of FIG. 7 for optimization with less computation.

Figure 1:
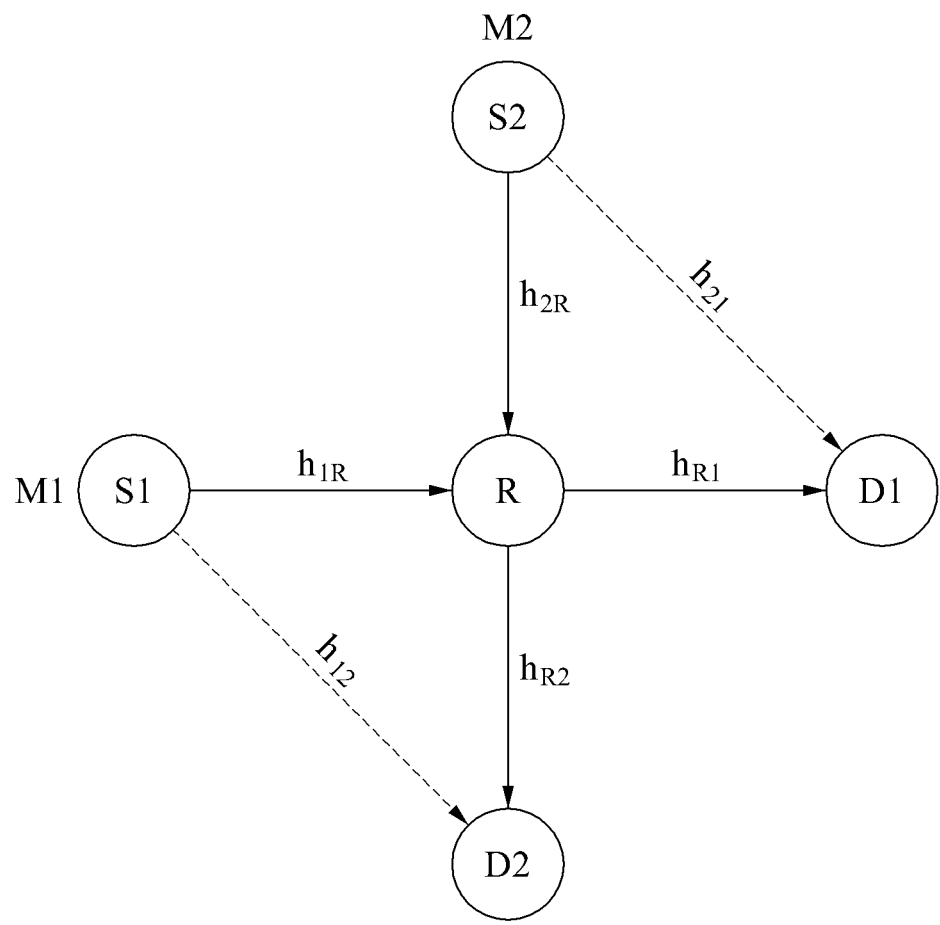
FIG. 1 is a diagram illustrating an exemplary wireless network.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. Also, description of well-known functions and constructions may be omitted for increased clarity and conciseness.

FIG. 1 illustrates an exemplary wireless network.

Referring to FIG. 1, the wireless network includes a first source node S1, a second source node S2, a relay node R, a first destination node D1, and a second destination node D2.

A channel $h_{1R}$ may be a channel from the first source node S1 to the relay node R, and a channel $h_{2R}$ may be a channel from the second source node S2 to the relay node R. Also, a channel $h_{R1}$ may be a channel from the relay node R to the first destination node D1, and a channel $h_{R2}$ may be a channel from the relay node R to the second destination node D2. Also, a channel $h_{12}$ may be a channel from the first source node S1 to the second destination node D2, and a channel $h_{21}$ may be a channel from the second source node S2 to the first destination node D1. The channel $h_{1R}$ and the channel $h_{2R}$ may be direct channels, and the channel $h_{12}$ and the channel $h_{21}$ may be overhearing channels.

The first source node S1 may be paired with the first destination node D1, and a first source message M1 may be transmitted by the first source node S1 to the first destination node D1. Also, the second source node S2 may be paired with the second destination node D2, and a second source message M2 may be transmitted by the second source node S2 to the second destination node D2.

Figure 2:
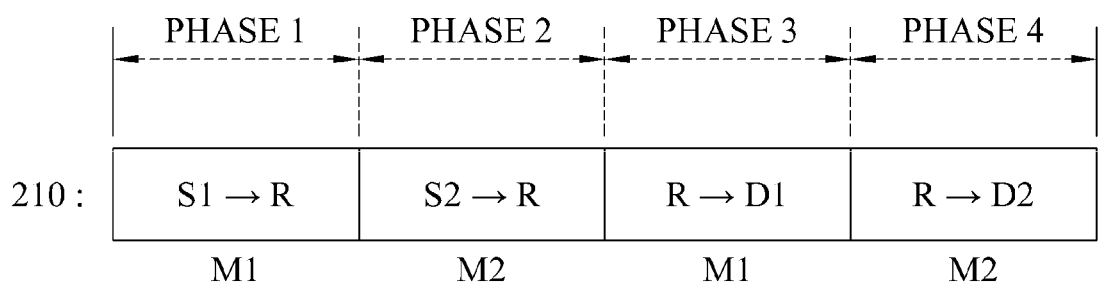
FIG. 2 is a diagram illustrating exemplary operations of a wireless network in a plurality of time periods.
Figure 2:
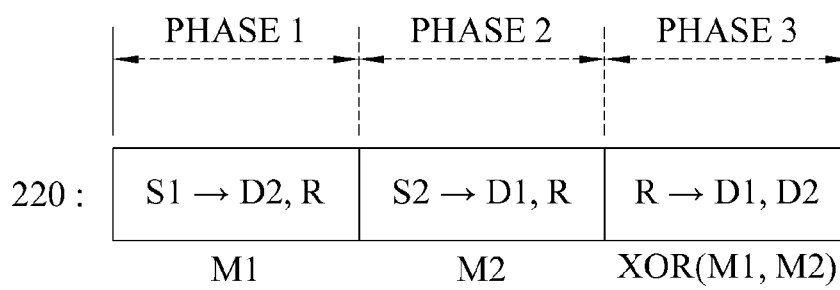

FIG. 2 is a diagram for illustrating exemplary operations of a wireless network in a plurality of time periods.

The operations of the wireless network in four time periods where the wireless network does not use a network coding scheme are illustrated in a first timeline 210 of FIG. 2.

Where the wireless network does not use the network coding scheme, four time periods may be required so that a first source node S1 may transmit a first source message M1 to a first destination node D1, and a second source node S2 may transmit a second source message M2 to a second destination node D2.

That is, the first source node S1 may transmit the first source message M1 to a relay node R during a first time period. The first time period may correspond to a PHASE 1. The second source node S2 may transmit the second source message M2 to the relay node R during a second time period corresponding to a PHASE 2. Accordingly, the relay node R may transmit the first source message M1 and the second source message M2 to the first destination node D1 and the second destination node D2 during a third time period and a fourth time period, respectively. The third time period and the fourth time period may correspond to a PHASE 3 and a PHASE 4, respectively.

The operations of the wireless network in three time periods where the wireless network uses the network coding scheme are illustrated in a second timeline 220 of FIG. 2. Where the wireless network uses the network coding scheme, three time periods may be required so that the first source node S1 may transmit the first source message M1 to the first destination node D1, and the second source node S2 may transmit the second source message M2 to the second destination node D2.

Referring to the second timeline 220 of FIG. 2, the first source node S1 may transmit the first source message M1 to the second destination node D2 and the relay node R during a first time period PHASE 1. In this case, the first source message M1 may be transmitted to the second destination node D2 through an overhearing channel $h_{12}$, and transmitted to the relay node R through a direct channel $h_{1R}$.

Also, the second source node S2 may transmit the second source message M2 to the relay node R and the first destination node D1 during a second time period PHASE 2. In this case, the second source message M2 may be transmitted to the first destination node D1 through an overhearing channel $h_{21}$, and transmitted to the relay node R through a direct channel $h_{2R}$.

The relay node R may encode the first source message M1 and the second source message M2, received during the first time period and the second time period, according to the network coding scheme. For example, the relay node R may encode the first source message M1 and the second source message M2 through an XOR operation, and thereby may generate a network-coded message, XOR(M1, M2).

During a third time period PHASE 3, the relay node R may transmit the network-coded message, XOR(M1, M2), to the first destination node D1 and the second destination node D2. In this case, the first destination node D1 may extract the first source message M1 from the network-coded message, XOR (M1, M2), using the second source message M2 overheard during the second time period PHASE 2. Similarly, the second destination node D2 may extract the second source message M2 from the network-coded message, XOR(M1, M2), using the first source message M1 overheard during the first time period PHASE 1.

However, where the wireless network is operated as illustrated in the second timeline 220 of FIG. 2, various issues may occur.

Generally, a state of the overhearing channels $h_{12}$ and $h_{21}$ may be inferior to a state of the direct channels $h_{1R}$ and $h_{2R}$. Accordingly, where the first source node S1 and the second source node S2 use the overhearing channels $h_{12}$ and $h_{21}$ during the first time period PHASE 1 and the second time period PHASE 2, an applicable data rate of the first source node S1 and the second source node S2 may be limited by the state of the overhearing channels $h_{12}$ and $h_{21}$. For example, where the first source node S1 transmits the first source message M1 during the first time period PHASE 1, the first source node S1 may need to apply a low data rate to the second destination node D2 although the first source node S1 may apply a high data rate to the relay node R. Accordingly, the applicable data rate of the first source node S1 may be reduced.

Also, where a state of the channels $h_{1R}$ and $h_{12}$ is significantly different from a state of the channels $h_{2R}$ and $h_{21}$, the network coding scheme may be prevented from being applied to the first source node S1 and the second source node S2, since a quality of the network-coded message, XOR(M1, M2), may be determined based on channels with an inferior state from among the channels $h_{1R}$ and $h_{12}$ and the channels $h_{2R}$ and $h_{21}$. The channels $h_{1R}$ and $h_{12}$ may correspond to a flow of the first source message M1, and the channels $h_{2R}$ and $h_{21}$ may correspond to a flow of the second source message M2.

However, the wireless network according to FIG. 1 may divide each of the first source message M1 and the second source message M2 into at least two partial source messages, and thus dependence on the overhearing channels $h_{12}$ and $h_{21}$ may be reduced. For example, where a state of the channel $h_{12}$ is significantly inferior to a state of the channel $h_{1R}$, the first source node S1 may transmit a portion of the first source message M1 to the relay node R and the second destination node D2 having a low data rate, and transmit a remaining portion of the first source message M1 to only relay node R having a high data rate, so that the second destination node D2 may perform decoding appropriately.

Also, the wireless network may appropriately adjust a length of a time period corresponding to the flows of the first source message M1 and the second source message M2. Accordingly, the throughput of the wireless network may increase.

Figure 3:
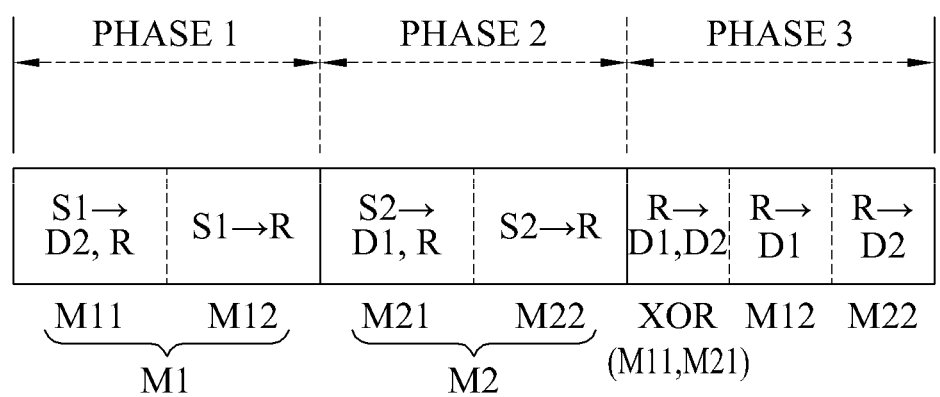
FIG. 3 is a diagram illustrating an exemplary operation of a wireless network using partial source messages in three time periods.
Figure 4:
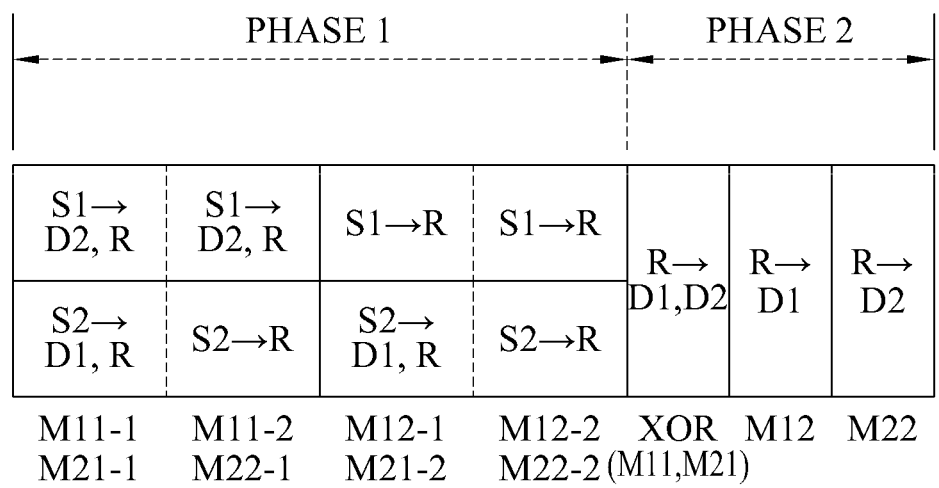
FIG. 4 is a diagram illustrating an exemplary operation of a wireless network using partial source messages in two time periods.
Figure 5:
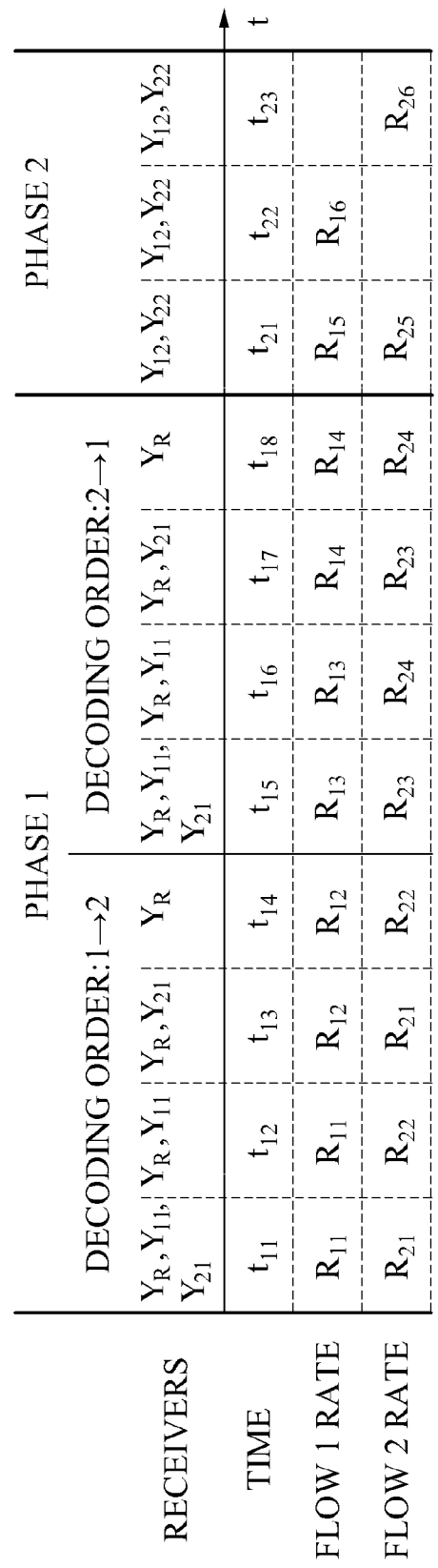
FIG. 5 is a diagram illustrating a data rate corresponding to a first source message, a data rate corresponding to a second source message, and a length of each time period based on a decoding order of a relay node in association with the exemplary operation of the wireless network of FIG. 4.

Operations of the wireless network are described further with reference to FIG. 3 through FIG. 5.

FIG. 3 is a diagram for illustrating an exemplary operation of a wireless network using partial source messages in three time periods.

A first source message M1 of a first source node S1 may be divided into a 1-1 partial source message M11 and a 1-2 partial source message M12. A second source message M2 of a second source node S2 may be divided into a 2-1 partial source message M21 and a 2-2 partial source message M22.

Referring to FIG. 3, a first time period corresponding to a PHASE 1 may be divided into two periods. The first source node S1 may transmit the 1-1 partial source message M11 to a second destination node D2 and a relay node R during a first period of the first time period PHASE 1. During the first period of the first time period PHASE 1, a data rate R11 applicable to the 1-1 partial source message M11 may be determined based on a state of each of an overhearing channel $h_{12}$ and a direct channel $h_{1R}$. Generally, since the state of the direct channel $h_{1R}$ may be superior to the state of the overhearing channel $h_{12}$, the data rate R11 applicable to the 1-1 partial source message M11 may be determined based on the state of the overhearing channel $h_{12}$ to enable the second destination node D2 and the relay node R to successfully perform decoding.

Also, the first source node S1 may transmit the 1-2 partial source message M12 to the relay node R during a second period of the first time period PHASE 1. During the second period of the first time period PHASE 1, the first source node S1 may determine a data rate R12 applicable to the 1-2 partial source message M12 based on the state of the direct channel $h_{1R}$ to enable the relay node R to successfully perform decoding. Generally, since the state of the direct channel $h_{1R}$ may be superior to the state of the overhearing channel $h_{12}$, the data rate R12 may be determined to be higher than the data rate R11.

Accordingly, the 1-1 partial source message M11 may be transmitted by the first source node S1 to enable the second destination node D2 and the relay node R to successfully perform decoding, and the 1-2 partial source message M12 may be transmitted to enable the relay node R to successfully perform decoding.

Also, the second source node S2 may transmit the 2-1 partial source message M21 and the 2-2 partial source message M22 of the second source message M2 during a second time period corresponding to a PHASE 2.

The second source node S2 may transmit the 2-1 partial source message M21 to a first destination node D1 and the relay node R during a first period of the second time period PHASE 2. During the first period of the second time period PHASE 2, a data rate R21 applicable to the 2-1 partial source message M21 may be determined based on a state of an overhearing channel $h_{21}$ and a state of a direct channel $h_{2R}$.

Also, the second source node S2 may transmit the 2-2 partial source message M22 to the relay node R during a second period of the second time period PHASE 2. During the first period of the second time period PHASE 2, the second source node S2 may determine a data rate R22 applicable to the 2-2 partial source message M22 based on the state of the direct channel $h_{2R}$. Generally, since the state of the direct channel $h_{2R}$ may be superior to the state of the overhearing channel $h_{21}$, the data rate R22 may be determined to be higher than the data rate R21.

Accordingly, the 2-1 partial source message M21 may be transmitted to enable the first destination node D1 and the relay node R to successfully perform decoding, and the 2-2 partial source message M22 may be transmitted to enable the relay node R to successfully perform decoding.

Also, the relay node R may apply the network coding scheme to the 1-1 partial source message M11 and the 2-1 partial source message M21, and thereby may generate a network-coded message, XOR(M11, M21).

In this case, the relay node R may transmit the network-coded message, XOR(M11, M21), to the first destination node D1 and the second destination node D2 during a first period of a third time period PHASE 3. Also, the relay node R may transmit the 1-2 partial source message M12 to the first destination node D1 during a second period of the third time period PHASE 3, and transmit the 2-2 partial source message M22 to the second destination node D2 during a third period of the third time period PHASE 3.

The first destination node D1 may decode the network-coded message, XOR(M11, M21), using the overheard 2-1 partial source message M21, and thereby may extract the 1-1 partial source message M11. Similarly, the second destination node D2 may extract the 2-1 partial source message M21 from the network-coded message, XOR(M11, M21), using the overheard 1-1 partial source message M11.

Accordingly, although the state of the overhearing channels $h_{12}$ and $h_{21}$ is not appropriate, the wireless network may appropriately control dependence on the overhearing channels $h_{12}$ and $h_{21}$ using partial source messages.

Referring to FIG. 3, the wireless network may optimize a length of each period included in the first time period PHASE 1, the second time period PHASE 2, and the third time period PHASE 3 in order to maximize a sum data rate corresponding to the first destination node D1 and the second destination node D2. Here, the sum data rate may include a concept of a weighted sum data rate. The weighted sum data rate may be obtained by summing a value, obtained by multiplying a data rate corresponding to the first destination node D1 with a predetermined weight, and a value obtained by multiplying a data rate for the second destination node D2 with another predetermined weight. Also, the sum data rate may include a value obtained by adding the data rate for the first destination node D1 and the data rate corresponding to the second destination node D2.

Here, it may be assumed that, $$y_R(t) = h_{1R}x_1(t) + h_{2R}x_2(t) + n_R \quad \text{[Equation 1]}$$

$$y_{21} = h_{12}x_1(t) + n_{21}$$

$$y_{22} = h_{R2}x_R(t) + n_{22}$$

$$y_{11} = h_{21}x_2(t) + n_{11}$$

$$y_{12} = h_{R1}x_R(t) + n_{12}$$

where, $y_R(t)$ a received signal of the relay node R, $x_1(t)$ a transmission signal of the first source node S1, $x_2(t)$ a transmission signal of the second source node S2, $n_R, n_{22}, n_{11}, n_{12}$: noise $y_{21}$: a received signal where the second destination node D2 overhears the transmission signal $x_1(t)$ $n_{21}$ noise in the second destination node D2

$x_R$: a transmission signal of the relay node R $y_{22}$: a received signal of the second destination node D2 with respect to the transmission signal $x_R$ $y_{11}$: a received signal where the first destination node D1 overhears the transmission signal $x_2(t)$ $y_{12}$: a received signal of the first destination node D1 with respect to the transmission signal $x_R$ Also, it may be assumed that every variance of $n_R$, $n_{21}$, $n_{22}$, $n_{11}$, $n_{12}$ is 1, and every channel is a slow fading channel. Also, it may be assumed that a data rate applicable to each channel is $C=0.5 \log\_2(1+SNR)$ where SNR is the ratio of the signal power to the noise power. Where a length of a $j_{th}$ period of an $i_{th}$ time period is $t_{ij}$, and a data rate applicable in the length $t_{ij}$ is $R_{ij}$, $R_{ij}$ may be represented as illustrated in the following Equation 2:

$$R_{11} = \min\left(C\left(\frac{|h_{12}|^2 P}{N}\right), C\left(\frac{|h_{1R}|^2 P}{N}\right)\right),$$

$$R_{12} = C\left(\frac{|h_{1R}|^2 P}{N}\right)$$

$$R_{21} = \min\left(C\left(\frac{|h_{21}|^2 P}{N}\right), C\left(\frac{|h_{2R}|^2 P}{N}\right)\right),$$

$$R_{22} = C\left(\frac{|h_{2R}|^2 P}{N}\right)$$

$$R_{31} = \min\left(C\left(\frac{|h_{R1}|^2 P}{N}\right), C\left(\frac{|h_{R2}|^2 P}{N}\right)\right)$$

$$R_{32} = C\left(\frac{|h_{R1}|^2 P}{N}\right),$$

$$R_{33} = C\left(\frac{|h_{R2}|^2 P}{N}\right)$$

[Equation 2]

where N may denote noise, and P may denote transmission power of every node. In this instance, the sum data rate for the first destination node D1 and the second destination node D2 may be represented as illustrated in the following Equation 3:

$$\text{sum data rate} = 2t_{31}R_{31} + t_{32}R_{32} + t_{33}R_{33}$$

[Equation 3]

Accordingly, the wireless network may determine the length, $t_{ij}$, to enable the sum data rate of Equation 3 to be maximized. Here, a constraint may be used. The constraint may be represented as illustrated in the following Equation 4:

$$t_{11}R_{11} = t_{21}R_{21} = t_{31}R_{31}$$

$$t_{12}R_{12} = t_{32}R_{32}, t_{22}R_{22} = t_{33}R_{33}$$

$$\sum_{i,j} t_{i,j} = 1$$

[Equation 4]

where a sum of $t_{ij}$ is normalized.

Accordingly, the wireless network may optimize a 1-1 partial period $t_{11}$, a 1-2 partial period $t_{12}$, a 2-1 partial period $t_{21}$, a 2-2 partial period $t_{22}$, a 3-1 partial period $t_{31}$, a 3-2 partial period $t_{32}$, [and a 3-3 partial period $t_{33}$] to enable the sum data rate to be maximized using Equation 1 through Equation 4.

However, referring to FIG. 3, it may be ascertained that the second source node S2 does not transmit the second source message M2 during the first time period PHASE 1 where the first source node S1 transmits the first source message M1. Where the relay node R may use a Successive Interference Cancellation (SIC) scheme, the first source node S1 and the second source node S2 may simultaneously transmit the first source message M1 and the second source message M2. Where the first source node S1 and the second source node S2 simultaneously transmit the first source message M1 and the second source message M2, three time periods may be reduced to two time periods, which is described further with reference to FIG. 4 and FIG. 5.

FIG. 4 is a diagram for illustrating an exemplary operation of a wireless network using partial source messages in two time periods.

FIG. 5 is a diagram for illustrating a data rate corresponding to a first source message, a data rate corresponding to a second source message, and a length of each time period based on a decoding order of a relay node in association with the operation of the wireless network of FIG. 4.

Referring to FIG. 4, a first source message M1 may be divided into a 1-1 partial source message M11 and a 1-2 partial source message M12, and a second source message M2 may be divided into a 2-1 partial source message M21 and a 2-2 partial source message M22. Also, the 1-1 partial source message M1 may be divided into a message M11-1 and a message M11-2, and the 1-2 partial source message M12 may be divided into a message M12-1 and a message M12-2. Also, the 2-1 partial source message M21 may be divided into a message M21-1 and a message M21-2, and the 2-2 partial source message M22 may be divided into a message M22-1 and a message M22-2.

A first source node S1 may transmit the message M11-1 to a second destination node D2 and a relay node R during a first period of a first time period PHASE 1. At the same time, a second source node S2 may transmit the message M21-1 to a first destination node D1 and the relay node R.

Also, the first source node S1 may transmit the message M11-2 to the second destination node D2 and the relay node R, and the second source node S2 may transmit the message M22-1 to the relay node R during a second period of the first time period PHASE 1.

Also, the first source node S1 may transmit the message M12-1 to the relay node R, and the second source node S2 may transmit the message M21-2 to the first destination node D1 and the relay node R during a third period of the first time period PHASE 1.

Also, the first source node S1 may transmit the message M12-2 to the relay node R, and the second source node S2 may transmit the message M22-2 to the relay node R during a fourth period of the first time period PHASE 1.

Here, it may be assumed that the relay node R uses an SIC scheme to distinguish a flow of the first source message M1 from a flow of the second source message M2.

In this case, the relay node R may generate a network-coded message XOR(M11, M21) using the message M11 and the message M21. The message M11 is received during the first period and the second period of the first time period PHASE 1, and the message M21 is received during the first period and the third period of the first time period PHASE 1.

Also, the relay node R may transmit the network-coded message, XOR(M11, M21), to the first destination node D1 and the second destination node D2 during a first period of a second time period PHASE 2. Also, the relay node R may transmit the message M12 to the first destination node D1 during a second period of the second time period PHASE 2, and transmit the message M22 to the second destination node D2 during a third period of the second time period PHASE 2.

In this case, the first destination node D1 may decode the network-coded message, XOR(M11, M21), using the message M21 overheard during the first period and the third period of the first time period PHASE 1, and thereby may extract the message M11. Similarly, the second destination node D2 may extract the message M21 from the network-coded message, XOR(M11, M21), using the message M11 overheard during the first period and the second period of the first time period PHASE 1.

Accordingly, the first destination node D1 may successfully extract the message M11 and the message M12, and the second destination node D2 may also successfully extract the message M21 and the message M22.

However, a data rate applicable during each of the periods may vary depending on a decoding order or an order that the relay node R eliminates interference from a received signal.

For example, where the relay node R first decodes the flow of the first source message M1 using the SIC scheme, the flow of the second source message M2 may function as interference with respect to the flow of the first source message M1. Accordingly, the data rate corresponding to the flow of the first source message M1 may be affected by the interference with respect to the flow of the second source message M2. Where the relay node R first decodes the flow of the second source message M2, the flow of the second source message M2 may be removed from the received signal. Accordingly, the flow of the second source message M2 may not function as interference with respect to the flow of the first source message M1. Also, the data rate corresponding to the flow of the first source message M1 may not be affected by the flow of the second source message M2.

Thus, in the wireless network according to FIG. 4, the relay node R may calculate a data rate applicable in each of the periods based on a decoding order with respect to the flow of the first source message M1 and the flow of the second source message M2. Also, the wireless network may optimize a length of each of the periods based on the data rate calculated based on the decoding order.

Referring to FIG. 5, where the relay node R decodes the flow of the first source message M1 earlier than the flow of the second source message M2 using the SIC scheme, the first time period PHASE 1 may include four periods $t_{11}$, $t_{12}$, $t_{13}$, and $t_{14}$. Where the relay node R decodes the flow of the second source message M2 earlier than the flow of the first source message M1, the first time period PHASE 1 may include four periods $t_{15}$, $t_{16}$, $t_{17}$, and $t_{18}$. Also, $Y_R$ may denote a received signal of the relay node R during the first time period PHASE 1, $Y_{11}$ may denote a received signal of the first destination node D1 during the first time period PHASE 1, and $Y_{21}$ may denote a received signal of the second destination node D2 during the first time period PHASE 1. Also, $Y_{12}$ may denote a received signal of the first destination node D1 during the second time period PHASE 2, and $Y_{22}$ may denote a received signal of the second destination node D2 during the second time period PHASE 2.

In this case, the wireless network may calculate the data rate corresponding to the flow of the first source message M1 and the data rate corresponding to the flow of the second source message M2 during each of the 11 periods, $t_{11}$, $t_{12}$, $t_{13}$, $t_{14}$, $t_{15}$, $t_{16}$, $t_{17}$, $t_{18}$, $t_{21}$, $t_{22}$, and $t_{23}$, based on the decoding order. The data rate corresponding to the flow of the first source message M1 and the data rate corresponding to the flow of the second source message M2 may be calculated as illustrated in the following Equation 5:

$$R_{11} = \min\left(C\left(\frac{|h_{12}|^2 P}{N}\right), C\left(\frac{|h_{1R}|^2 P}{N + |h_{2R}|^2 P}\right)\right)$$

$$R_{21} = \min\left(C\left(\frac{|h_{21}|^2 P}{N}\right), C\left(\frac{|h_{2R}|^2 P}{N}\right)\right)$$

$$R_{13} = \min\left(C\left(\frac{|h_{12}|^2 P}{N}\right), C\left(\frac{|h_{1R}|^2 P}{N}\right)\right)$$

$$R_{14} = C\left(\frac{|h_{1R}|^2 P}{N}\right)$$

$$R_{23} = \min\left(C\left(\frac{|h_{21}|^2 P}{N}\right), C\left(\frac{|h_{2R}|^2 P}{N + |h_{1R}|^2 P}\right)\right)$$

$$R_{24} = C\left(\frac{|h_{2R}|^2 P}{N + |h_{1R}|^2 P}\right).$$

$$R_{15} = \min\left(C\left(\frac{|h_{R1}|^2 P}{N}\right), C\left(\frac{|h_{R2}|^2 P}{N}\right)\right)$$

$$R_{25} = \min\left(C\left(\frac{|h_{R1}|^2 P}{N}\right), C\left(\frac{|h_{R2}|^2 P}{N}\right)\right)$$

$$R_{16} = C\left(\frac{|h_{R1}|^2 P}{N}\right)$$

$$R_{26} = C\left(\frac{|h_{R2}|^2 P}{N}\right)$$

$$R_{22} = C\left(\frac{|h_{2R}|^2 P}{N}\right)$$

$$R_{12} = C\left(\frac{|h_{1R}|^2 P}{N + |h_{2R}|^2 P}\right)$$

[Equation 5]

In this case, a sum data rate corresponding to the first destination node D1 and the second destination node D2 may be represented as illustrated in the following Equation 6:

$$\text{sum data rate} = 2t_{21}R_{15} + t_{22}R_{16} + t_{23}R_{26} \quad \text{[Equation 6]}$$

In this case, the wireless network may determine a length of each of the eight periods, $t_{11}$, $t_{12}$, $t_{13}$, $t_{14}$, $t_{15}$, $t_{16}$, $t_{17}$, and $t_{18}$, to maximize the sum data rate correspond to the first destination node D1 and the second destination node D2. The length of each of the 11 periods, $t_{11}$, $t_{12}$, $t_{13}$, $t_{14}$, $t_{15}$, $t_{16}$, $t_{17}$, $t_{18}$, $t_{21}$, $t_{22}$, and $t_{23}$, may be determined by the following Equation 7:

$$t_{11}R_{11} + t_{21}R_{21} + t_{15}R_{13} + t_{16}R_{13} \geq t_{21}R_{31}$$

$$t_{11}R_{21} + t_{13}R_{21} + t_{15}R_{23} + t_{17}R_{23} \geq t_{21}R_{31}$$

$$t_{13}R_{12} + t_{14}R_{12} + t_{17}R_{14} + t_{18}R_{14} \geq t_{22}R_{32}$$

$$t_{12}R_{22} + t_{14}R_{22} + t_{16}R_{24} + t_{18}R_{24} \geq t_{23}R_{33}$$

$$\sum_{i,j} t_{i,j} = 1.$$

[Equation 7]

Accordingly, the wireless network may calculate a data rate corresponding to each of the 11 periods, $t_{11}$, $t_{12}$, $t_{13}$, $t_{14}$, $t_{15}$, $t_{16}$, $t_{17}$, $t_{18}$, $t_{21}$, $t_{22}$, and $t_{23}$, based on the decoding order. Also, the wireless network may optimize the length of each of the 11 periods, $t_{11}$, $t_{12}$, $t_{13}$, $t_{14}$, $t_{15}$, $t_{16}$, $t_{17}$, $t_{18}$, $t_{21}$, $t_{22}$, and $t_{23}$, based on the calculated data rate corresponding to each of the 11 periods, $t_{11}$, $t_{12}$, $t_{13}$, $t_{14}$, $t_{15}$, $t_{16}$, $t_{17}$, $t_{18}$, $t_{21}$, $t_{22}$, and $t_{23}$. For example, the wireless network may determine the optimized length of each of the 11 periods, $t_{11}, t_{12}, t_{13}, t_{14}, t_{15}, t_{16}, t_{17}, t_{18}, t_{21}, t_{22}$, and $t_{23}$, to maximize the sum data rate corresponding to the first destination node D1 and the second destination node D2.

FIG. 6 is a diagram illustrating a data rate corresponding to a first source message, a data rate corresponding to a second source message, and a length of each time period based on a decoding order of a relay node in association with the exemplary operation of the wireless network of FIG. 4, to assist in the understanding of FIG. 5.

Referring to FIG. 6, as described in FIG. 5, where the relay node R decodes the flow of the first source message M1 earlier than the flow of the second source message M2, the first time period PHASE 1 may include four partial time periods $t_{11}, t_{12}, t_{13}$, and $t_{14}$. M11 may be transmitted at a data rate of $R_{11}$ in the partial time periods $t_{11}$ and $t_{12}$. M21 may be transmitted at a data rate of $R_{21}$ in the partial time period $t_{11}$, and M22 may be transmitted at a data rate of $R_{22}$ in the partial time period $t_{12}$. Also, M12 may be transmitted at a data rate of $R_{12}$ in the partial time periods $t_{13}$ and $t_{14}$, M21 may be transmitted at the data rate of $R_{21}$ in the partial time period $t_{13}$, and M22 may be transmitted at the data rate of $R_{22}$ in the partial time period $t_{14}$.

Where the relay node R decodes the flow of the second source message M2 earlier than the flow of the first source message M1, the first time period PHASE 1 may include four periods $t_{15}, t_{16}, t_{17}$, and $t_{18}$. Also, the second time period PHASE 2 may include three partial time periods $t_{21}, t_{22}$, and $t_{23}$. Detailed description on $t_{15}, t_{16}, t_{17}, t_{18}, t_{21}, t_{22}$, and $t_{23}$ may be omitted herein.

Where a data rate to be applied to each of the 11 partial time periods, $t_{11}, t_{12}, t_{13}, t_{14}, t_{15}, t_{16}, t_{17}, t_{18}, t_{21}, t_{22}$, and $t_{23}$, is calculated through Equation 5, the length of each of the 11 partial time periods, $t_{11}, t_{12}, t_{13}, t_{14}, t_{15}, t_{16}, t_{17}, t_{18}, t_{21}, t_{22}$, and $t_{23}$ may be calculated using Equation 6 and Equation 7.

However, optimizing the length of each of the 11 partial time periods, $t_{11}, t_{12}, t_{13}, t_{14}, t_{15}, t_{16}, t_{17}, t_{18}, t_{21}, t_{22}$, and $t_{23}$ through Equation 6 and Equation 7 may require a relatively significant amount of computation. Accordingly, optimization with less computation may be required.

An appropriate state of overhearing channels is required to achieve a performance using a network coding scheme. Where a state of overhearing channels of the first destination node and the second destination node is not significantly inferior (or, where a Signal to Noise Ratio (SNR) of each of the overhearing channels is greater than a reference level), an assumption of Equation 8 may be made.

$$R_{11}=R_{12} \leqq R_{13} \leqq R_{14} \quad \text{[Equation 8]}$$

and $$R_{23}=R_{24} \leqq R_{21} \geqq R_{22}$$

Where the assumption of Equation 8 is made, the first source node may prefer to transmit M11 to M12. Since the first source node may apply the network coding scheme to M12, a higher performance may be achieved by transmitting M11. A portion of the 11 partial time periods, $t_{11}, t_{12}, t_{13}, t_{14}, t_{15}, t_{16}, t_{17}, t_{18}, t_{21}, t_{22}$, and $t_{23}$ may be omitted. Specifically, the performance may not be degraded even where $t_{13}=t_{14}=t_{16}=t_{18}=0$ in FIG. 6.

FIG. 7 is a diagram illustrating an exemplary table for optimization with less computation.

It has been described that a performance may not be significantly degraded where the assumption of Equation 8 is made, even where $t_{13}=t_{14}=t_{16}=t_{18}=0$ in FIG. 6. Where $t_{13}=t_{14}=t_{16}=t_{18}=0$, the table of FIG. 6 may be simplified as shown in FIG. 7.

Only seven periods may be parameters in the table of FIG. 7 from among the 11 partial time periods, $t_{11}, t_{12}, t_{13}, t_{14}, t_{15}, t_{16}, t_{17}, t_{18}, t_{21}, t_{22}$, and $t_{23}$. Since the 11 parameters are reduced to the seven parameters, computation for optimization may be relatively reduced.

Specifically, the optimization of Equation 7 may be simplified as, $$\max_{t_{i,j}}(2t_{21}R_{15} + t_{22}R_{16} + t_{23}R_{26}) \quad \text{[Equation 9]}$$

subject to $$t_{11}R_{11} + t_{12}R_{11} + t_{15}R_{13} \geq t_{15}R_{15}$$

$$t_{11}R_{21} + t_{15}R_{23} + t_{17}R_{23} \geq t_{15}R_{15}$$

$$t_{17}R_{14} \geq t_{22}R_{16}$$

$$t_{12}R_{22} \geq t_{23}R_{26}$$

$$\sum_{i,j} t_{i,j} = 1$$

Referring to Equation 9, the optimization may be relatively simplified. That is, where the assumption of Equation 8 is made, the 11 parameters may be reduced to the seven parameters.

In this instance, the table of FIG. 7 may be simplified more, which is described in greater detail with reference to FIG. 8.

FIG. 8 is a diagram illustrating exemplary simplified tables of FIG. 7 for optimization with less computation.

An optimization table (1) 810 and an optimization table (2) 820 may be used where a decoding order with respect to a flow 1 of a first source message and a flow 2 of a second source message is determined. The optimization table (1) 810 may be used where a relay node decodes the flow 2 of the second source message earlier than the flow 1 of the first source message. The optimization table (2) 820 may be used where the relay node decodes the flow 1 of the first source message earlier than the flow 2 of the second source message.

Referring to the optimization table (1) 810 and the table of FIG. 7, the optimization may be optimizing a length of each of the four periods, $t_{15}, t_{17}, t_{21}$, and $t_{22}$. Where it is determined that the relay node decodes the flow 2 earlier than the flow 1, the optimization may be achieved by calculating only the length of each of the four periods, $t_{15}, t_{17}, t_{21}$, and $t_{22}$, since $t_{11}=t_{12}=0$. Accordingly, computation may be reduced.

Similarly, referring to the optimization table (2) 820 and the table of FIG. 7, the optimization may be optimizing a length of each of the four periods, $t_{11}, t_{12}, t_{21}$, and $t_{22}$. Where it is determined that the relay node decodes the flow 1 earlier than the flow 2, the optimization may be achieved by calculating only the length of each of the four periods, $t_{11}, t_{12}, t_{21}$, and $t_{22}$, since $t_{15}=t_{17}=0$. Accordingly, computation may be reduced.

Also, the optimization table (1) 810 may be adaptively applied where a state of a channel of the flow 1 is significantly superior to a state of a channel of the flow 2. The channel of the flow 1 may be a direct channel corresponding to the flow 1, and the channel of the flow 2 may be a direct channel corresponding to the flow 2. For example, the optimization table (1) 810 may be adaptively applied where an SNR of the channel of the flow 1 is greater than a sum of an SNR of the channel of the flow 2 and H. Here, H may be a predetermined positive number. Conversely, the optimization table (2) 820 may be adaptively applied where the state of the channel of the flow 2 is significantly superior to the state of the channel of the flow 1. For example, the optimization table (2) 820 may be adaptively applied where the SNR of the channel of the flow 2 is greater than a sum of the SNR of the channel of the flow 1 and H.

Also, an optimization table (3) 830 may be adaptively applied where the state of the channel of the flow 2 is similar to the state of the channel of the flow 1, and a state of overhearing channels is superior to a reference level. A similarity of the state of the channel of the flow 2 and the state of the channel of the flow 1 may indicate a difference between the state of the channel of the flow 2 and the state of the channel of the flow 1 is within a predetermined range. Referring to the optimization table (3) 830, it may be ascertained that the relay node transmits only a network-coded message.

Since the optimization table (3) 830 includes only three time periods $t_{11}$, $t_{15}$, and $t_{21}$, the optimization may be achieved with less computation.

Accordingly, referring to the optimization table (1) 810, the optimization table (2) 820, and the optimization table (3) 830, seven time periods included in the table of FIG. 7 may be reduced. Thus, the computation for the optimization may be relatively reduced.

Figure 9:
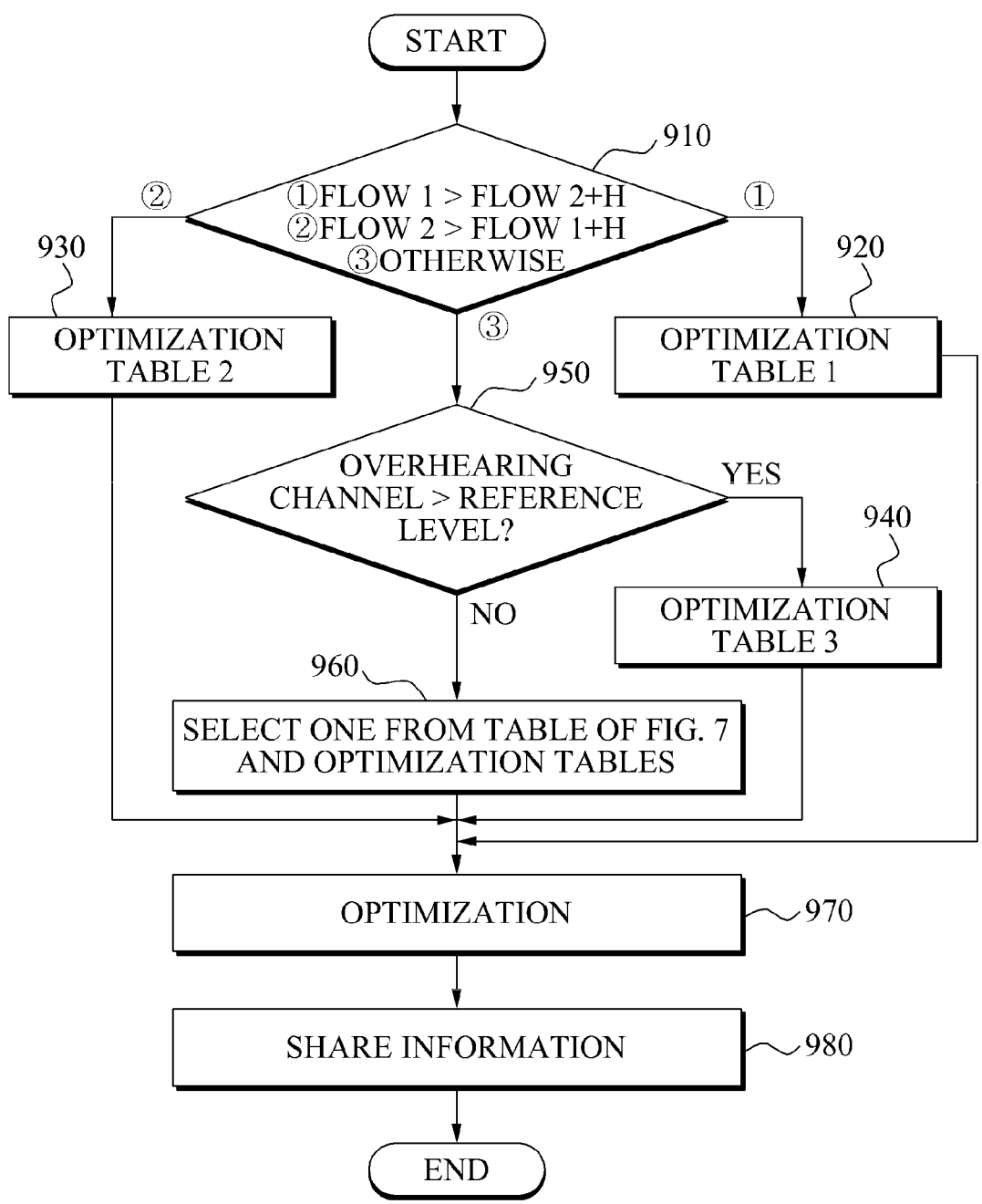
FIG. 9 is a flowchart illustrating exemplary operations of selecting and using an appropriate optimization table for optimization.

FIG. 9 is a flowchart illustrating exemplary operations of selecting and using an appropriate optimization table for optimization.

Referring to FIG. 9, in operation 910, an appropriate optimization table may be selected based on a state of a channel (direct channel) of a flow 1 and a state of a channel (direct channel) of a flow 2.

Where the state such as an SNR of the channel of the flow 1 is greater than a sum of the state such as an SNR of the channel of the flow 2 and H, an optimization table 1 may be selected in operation 920. Here, H may be a predetermined positive number. Conversely, where the state such as the SNR of the channel of the flow 2 is greater than a sum of the state such as the SNR of the channel of the flow 1 and H, an optimization table 2 may be selected in operation 930. Otherwise, determining in operation 950 may be performed.

Where the optimization table 1 illustrated in FIG. 8 is selected, optimizing may be performed using the optimization table 1 of FIG. 8 in operation 970. In this instance, lengths of four time periods, $t_{15}$, $t_{17}$, $t_{21}$, and $t_{22}$ may be optimized.

Where the optimization table 2 illustrated in FIG. 8 is selected, optimizing may be performed using the optimization table 2 of FIG. 8 in operation 970. In this instance, lengths of four time periods, $t_{11}$, $t_{12}$, $t_{21}$, and $t_{22}$ may be optimized.

Where the state of the channel of the flow 1 is similar to the state of the channel of the flow 2 within a predetermined range, it may be determined whether a state of overhearing channels is greater than a reference level in operation 950.

Where the state of the channel of the flow 1 is similar to the state of the channel of the flow 2 within the predetermined range, and the state of overhearing channels is greater than the reference level, an optimization table 3 may be selected in operation 940. The optimization may be performed using the optimization table 3, and lengths of the optimized time periods $t_{11}$, $t_{15}$, and $t_{21}$ may be calculated in operation 970.

Conversely, where the state of the channel of the flow 1 is similar to the state of the channel of the flow 2 within the predetermined range, and the state of overhearing channels is not greater than the reference level, any one may be selected from the table of FIG. 7 and the three optimization tables of FIG. 8 in operation 960. The optimization may be performed based on the selected optimization table in operation 970.

Where all the optimized lengths are calculated using an appropriate optimization table, information about the optimized lengths may be shared in operation 980. That is, a first source node, a second source node, a relay node, a first destination node, and a second destination node may share the information.

The methods described above including an operation method of a relay node may be recorded, stored, or fixed in one or more computer-readable media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

According to certain embodiments described above, a wireless network may use partial source messages of source messages to apply a network coding scheme, and thereby may prevent a data rate from being reduced where any one of an overhearing channel and a direct channel is not appropriately operated.

Also, a wireless network may optimize a length of a time period that destination nodes overhear partial source messages of source messages, and thereby may increase throughput of the wireless network.

Furthermore, source nodes may transmit partial source messages during a same time period and a relay node may extract the received partial source messages using an SIC scheme, and thus a wireless network may improve efficiency of wireless resources, such as time.

Moreover, where a relay node uses an SIC scheme, a wireless network may optimize a length of a time period that destination nodes overhear partial source messages of source messages, or a length of a time period that source nodes transmit the partial source messages to only relay node, based on a decoding order, that is, an order of applying an SIC.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An operation method of a relay node, the method comprising:

receiving a 1-1 partial source message and a 1-2 partial source message from a first source node, a first source message of the first source node including the 1-1 partial source message and the 1-2 partial source message;

receiving a 2-1 partial source message and a 2-2 partial source message from a second source node, a second source message of the second source node including the 2-1 partial source message and the 2-2 partial source message;

generating a network-coded message by applying a logical operation to operands of the 1-1 partial source message and the 2-1 partial source message; and transmitting the network-coded message to a first destination node corresponding to the first source node and a second destination node corresponding to the second source node.

2. The operation method of claim 1, wherein the first destination node receives the 2-1 partial source message, and the second destination node receives the 1-1 partial source message.

3. The operation method of claim 2, wherein the first destination node decodes the network-coded message based on the received 2-1 partial source message, and the second destination node decodes the network-coded message based on the received 1-1 partial source message.

4. The operation method of claim 1, wherein the transmitting comprises:

transmitting the 1-2 partial source message to the first destination node; and transmitting the 2-2 partial source message to the second destination node.

5. The operation method of claim 1, wherein the 1-1 partial source message and the 1-2 partial source message are determined based on a sum data rate corresponding to the first destination node and the second destination node.

6. The operation method of claim 1, wherein the 1-1 partial source message is transmitted to enable the second destination node and the relay node to successfully perform decoding, the 1-2 partial source message is transmitted to enable at least the relay node to successfully perform decoding, the 2-1 partial source message is transmitted to enable the first destination node and the relay node to successfully perform decoding, or the 2-2 partial source message is transmitted to enable at least the relay node to successfully perform decoding.

7. The operation method of claim 1, wherein a size of each of the 2-1 partial source message and 2-2 partial source message is determined based on a sum data rate corresponding to the first destination node and the second destination node.

8. The operation method of claim 1, wherein the receiving of the 1-1 partial source message and the 1-2 partial source message comprises receiving the 1-1 partial source message during a 1-1 partial period and receiving the 1-2 partial source message during a 1-2 partial period different from the 1-1 partial period.

9. The operation method of claim 8, wherein the duration of each of the 1-1 partial period and the 1-2 partial period is adaptively adjusted based on a sum data rate corresponding to the first destination node and the second destination node.

10. The operation method of claim 1, wherein the receiving of the 2-1 partial source message and the 2-2 partial source message comprises receiving the 2-1 partial source message during a 2-1 partial period and receiving the 2-2 partial source message during a 2-2 partial period different from the 2-1 partial period.

11. The operation method of claim 10, wherein the duration of each of the 2-1 partial period and the 2-2 partial period is adaptively adjusted based on a sum data rate corresponding to the first destination node and the second destination node.

12. The operation method of claim 1, wherein the first source node transmits the 1-1 partial source message and the 1-2 partial source message during a first time period, and the second source node transmits the 2-1 partial source message and the 2-2 partial source message during a second time period, the first time period being different from the second time period.

13. The operation method of claim 12, wherein the transmitting of the network-coded message comprises transmitting the network-coded message during a third time period, the third time period being different from the first time period and the second time period.

14. An operation method of a relay node, the method comprising:

receiving a 1-1 partial source message and a 1-2 partial source message from a first source node, and receiving a 2-1 partial source message and a 2-2 partial source message from a second source node during a first time period, a first source message of the first source node including the 1-1 partial source message and the 1-2 partial source message, and a second source message of the second source node including the 2-1 partial source message and the 2-2 partial source message;

extracting the 1-1 partial source message, the 1-2 partial source message, the 2-1 partial source message, and the 2-2 partial source message, using a Successive Interference Cancellation (SIC) scheme based on a decoding order with respect to the first source message and the second source message; and transmitting a network-coded message to a first destination node corresponding to the first source node and a second destination node corresponding to the second source node during a second time period, the network-coded message being generated based on the extracted 1-1 partial source message and 2-1 partial source message, and the second time period being different from the first time period.

15. The operation method of claim 14, wherein the first destination node receives the 2-1 partial source message, and the second destination node receives the 1-1 partial source message.

16. The operation method of claim 14, wherein the 1-1 partial source message is transmitted to enable the second destination node and the relay node to successfully perform decoding, the 1-2 partial source message is transmitted to enable at least the relay node to successfully perform decoding, the 2-1 partial source message is transmitted to enable the first destination node and the relay node to successfully perform decoding, or the 2-2 partial source message is transmitted to enable at least the relay node to successfully perform decoding.

17. The operation method of claim 15, wherein the duration of a period that the first destination node receives the 2-1 partial source message or the duration of a period that the second destination node receives the 1-1 partial source message is adaptively adjusted based on the decoding order or a sum data rate corresponding to the first destination node and the second destination node.

18. The operation method of claim 14, wherein the first source node recognizes a data rate applicable to the 1-1 partial source message and the 1-2 partial source message based on the decoding order, or the second source node recognizes a data rate applicable to the 2-1 partial source message and the 2-2 partial source message based on the decoding order.

19. The operation method of claim 15, wherein the first destination node decodes the network-coded message based on the received 2-1 partial source message, and the second destination node decodes the network-coded message based on the received 1-1 partial source message.

20. The operation method of claim 14, wherein the transmitting comprises:
   transmitting the 1-2 partial source message to the first destination node; and
   transmitting the 2-2 partial source message to the second destination node.

21. The operation method of claim 14, wherein,
   where the first source message is decoded earlier than the second source message, the first time period includes partial time periods, $t_{11}$, $t_{12}$, $t_{13}$, and $t_{14}$,
   where the second source message is decoded earlier than the first source message, the first time period includes partial time periods, $t_{15}$, $t_{16}$, $t_{17}$, and $t_{18}$, and
   where the second time period includes partial time periods, $t_{21}$, $t_{22}$, and $t_{23}$, the partial time periods, $t_{11}$, $t_{12}$, $t_{13}$, $t_{14}$, $t_{15}$, $t_{16}$, $t_{17}$, $t_{18}$, $t_{21}$, $t_{22}$, and $t_{23}$, are optimized based on a sum data rate corresponding to the first destination node and the second destination node.

22. The operation method of claim 21, wherein, where a state of a reception channel of each of the first destination node and the second destination node is superior to a reference level, a portion of the partial time periods, $t_{11}$, $t_{12}$, $t_{13}$, $t_{14}$, $t_{15}$, $t_{16}$, $t_{17}$, $t_{18}$, $t_{21}$, $t_{22}$, and $t_{23}$, is recognized as being non-existent.

23. The operation method of claim 21, wherein, where the decoding order with respect to the first source message and the second source message is determined, a portion of the partial time periods, $t_{11}$, $t_{12}$, $t_{13}$, $t_{14}$, $t_{15}$, $t_{16}$, $t_{17}$, $t_{18}$, $t_{21}$, $t_{22}$, and $t_{23}$, is recognized as being non-existent.

24. The operation method of claim 21, wherein, where a state of a reception an overhearing channel of each of the first destination node and the second destination node is superior to a reference level, and a state of a channel between the first source node and the relay node is similar to a state of a channel between the second source node and the relay node within a predetermined range, a portion of the partial time periods, $t_{11}$, $t_{12}$, $t_{13}$, $t_{14}$, $t_{15}$, $t_{16}$, $t_{17}$, $t_{18}$, $t_{21}$, $t_{22}$, and $t_{23}$, is recognized as being non-existent.

25. A non-transitory computer-readable recording medium storing a program for implementing an operation method of a relay node, the method comprising:
   receiving a 1-1 partial source message and a 1-2 partial source message from a first source node, a first source message of the first source node including the 1-1 partial source message and the 1-2 partial source message;
   receiving a 2-1 partial source message and a 2-2 partial source message from a second source node, a second source message of the second source node including the 2-1 partial source message and the 2-2 partial source message;
   generating a network-coded message by applying a logical operation to operands of the 1-1 partial source message and the 2-1 partial source message; and
   transmitting the network-coded message to a first destination node corresponding to the first source node and a second destination node corresponding to the second source node.

26. The method of claim 1, wherein the logical operation is an exclusive-OR operation.

27. The method of claim 1, further comprising:
   receiving, at the first destination node, the 2-1 partial source message; and
   applying, at the first destination node, an exclusive-OR operation to operands of the received network-coded message and 2-1 partial source message to extract the 1-1 partial source message.

28. The method of claim 1, wherein the network-coded message is generated such that:
   the 1-1 partial source message cannot be derived from the network-coded message without knowledge of the 2-1 partial source message, and
   the 2-1 partial source message cannot be derived from the network-coded message without knowledge of the 1-1 partial source message.

* * * * *